United States Patent [19]

Gartner et al.

[11] Patent Number: 5,822,521
[45] Date of Patent: Oct. 13, 1998

[54] METHOD AND APPARATUS FOR ASSIGNING POLICY PROTOCOLS IN A DISTRIBUTED SYSTEM

[75] Inventors: Harold Jeffrey Gartner, Thornhill; Vladimir Klicnik, Oshawa; Michael Starkey, North York; John Wright Stephenson, Oshawa, all of Canada

[73] Assignee: International Business Machines Corporation, Armonk, N.Y.

[21] Appl. No.: 709,085

[22] Filed: Sep. 6, 1996

[30] Foreign Application Priority Data

Nov. 6, 1995 [CA] Canada ................................ 2162188

[51] Int. Cl.$^6$ ...................................... G06F 13/14
[52] U.S. Cl. ...................... 395/200.6; 395/682; 395/684
[58] Field of Search ...................... 395/610, 614, 395/680, 682, 683, 684, 200.31, 200.32, 200.33, 200.47, 200.57, 200.6; 707/10, 103

[56] References Cited

U.S. PATENT DOCUMENTS

| | | | |
|---|---|---|---|
| 5,136,716 | 8/1992 | Harvey et al. ................... | 395/200.58 |
| 5,218,699 | 6/1993 | Brandle et al. ................... | 395/684 |
| 5,408,619 | 4/1995 | Oran ................................. | 707/10 |
| 5,491,800 | 2/1996 | Goldsmith et al. ............... | 395/200.51 |
| 5,511,197 | 4/1996 | Hill et al. ......................... | 395/683 |
| 5,596,723 | 1/1997 | Romohr ........................... | 395/200.52 |

*Primary Examiner*—Parshotam S. Lall
*Assistant Examiner*—Viet Vu
*Attorney, Agent, or Firm*—David A. Mims, Jr.

[57] ABSTRACT

A framework having a plurality of directories representing different types of middlewares and distributed object systems can be constructed from data provided in a class library. Each directory includes the name and address of all service objects, located across multiple servers in the system, that supports the specific middleware or distributed object policy characteristics for that directory. One service object may be addressed through multiple directories. When a remote method call is issued by a client, a list of service objects capable of executing the call is obtained from the directories and one object selected. The policy characteristics associated with the directory from which the object address is selected, are attached to the call. These characteristics are validated when the addressed server receives the call. In this way, a client program can be written entirely independently of the middleware or peculiarity of implementation of the distributed object service.

8 Claims, 3 Drawing Sheets

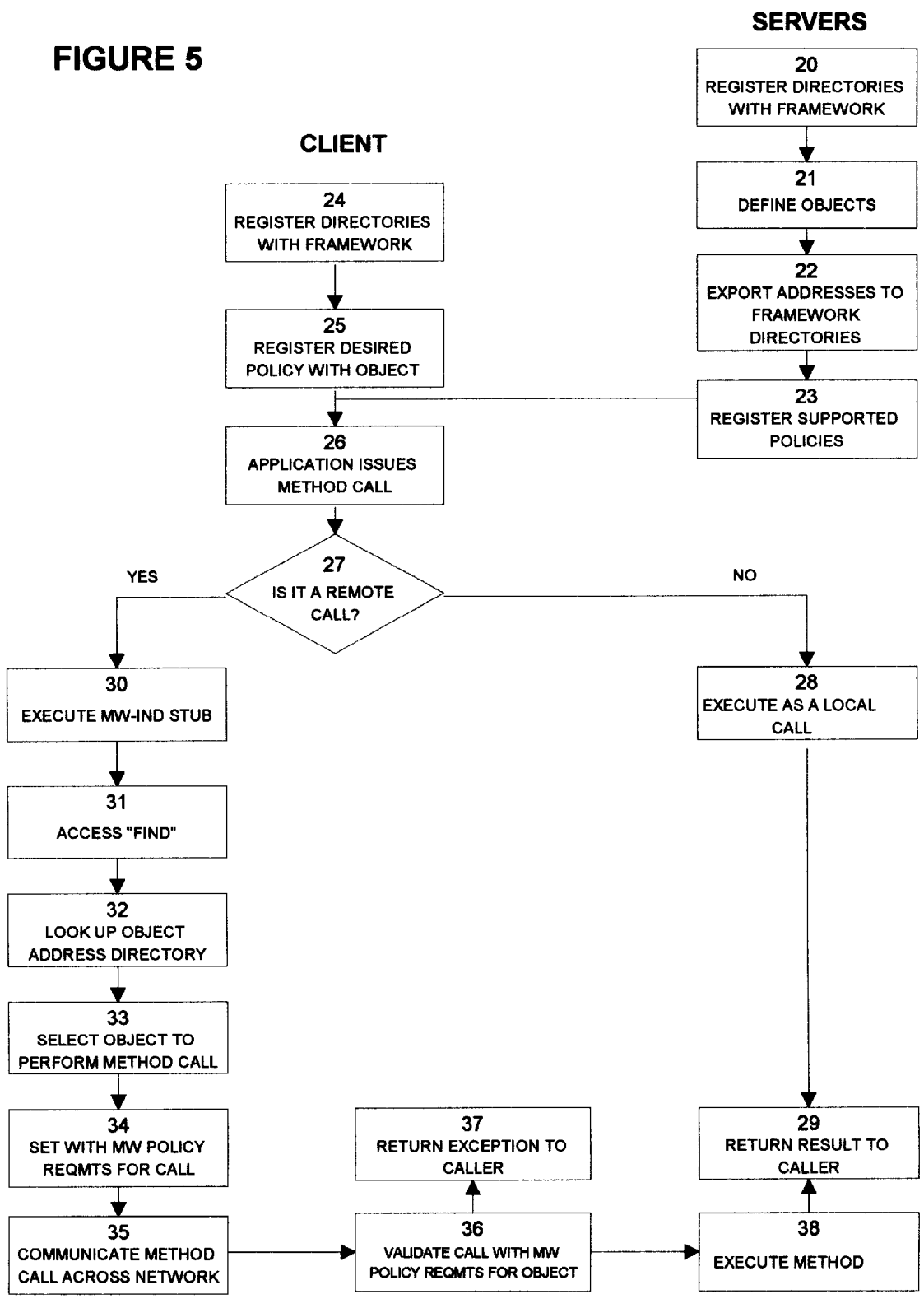

METHOD AND APPARATUS FOR ASSIGNING POLICY PROTOCOLS IN A DISTRIBUTED SYSTEM

The present invention is directed to providing a framework supporting the use of multiple middlewares in a distributed computing environment. The invention is particularly useful in association with a partitioning tool permitting the user to convert a monolithic application into a distributed application.

BACKGROUND

A distributed system may, very generically, be described as an aggregate of individual systems or processors connected via electronic communications. This could range from tightly coupled parallel processors to loosely coupled remote processors and workstations forming a local area network or LAN.

A distributed application is a number of cooperating software parts or services distributed over a number of processors in a distributed system or network. Two existing systems of International Business Machines Corporation that support distributed applications are the CICS™ product line of transactional processing systems and the IMS™ family of client-server systems.

With the increased processing power of smaller computers and communications flexibility of networks, distributed applications can be used to replace complex monolithic applications. Use of distributed applications has a number of advantages, including lower hardware costs in being able to use a number of existing smaller processors linked together to replace a single very large processing unit. In addition to the up-front cost saving, continuing savings are experienced because failures in one hardware component do not affect the entire system. On the software side, new services can be added or existing services upgraded in a single software part without requiring all clients across the network to be recompiled or relinked using distributed applications.

Normally there is a unique interface between a calling program and a specific subroutine or object, and a procedure called from the calling program to the subroutine invokes all necessary logic for operability. Where the program is distributed, there must be location transparency, and this has two important requirements. The first requirement is to find a server that can perform the desired action. In a distributed system provision of a service may be a complex implementation of communicating server objects. One way of making this transparent is to have the client declare a local object, called a proxy, in order to use the service. The proxy is a local object representing the distributed object, and it directly receives all of the client's communications for that service. The concept of "proxies" is discussed in some detail in "Structure and Encapsulation in Distributed Systems: The Proxy Principle" by Shapiro, Marc, published in the Proceedings of the 6th International Conference on Distributed Systems, May 1986.

The second requirement of location transparency is to provide similar policies for accessing services as those used in the nondistributed program. Some policies are implicit in a nondistributed program, such as accessibility of services, since the program may be bound into one execution unit. Other policies may be assumed by the nondistributed program, such as service time. Still other policies may be assumed such as the integrity of the data. Data passed assumed to be protected within one machine may need to be protected when passed between a client and a server machine on a distributed system, particularly where that distributed system is a public network.

A distributed system may be made up of diverse types of computers and processing platforms, each with their own data formatting and communications protocols, preventing direct communication between them without the manual coding of interfaces to translate these protocols.

Middleware technologies have been developed to address this and provide "transparent" communications between heterogeneous platforms. One example of this is the Distributed Computing Environment® (DCE) of the Open Software Foundation. When implemented on each of a number of disparate systems, DCE allows transparent interoperation between computers on the network through a mechanism called the remote procedure call (rpc) that automatically invokes the communication services for the programmer so that all communications code, error handling and data conversion are handled transparently. In DCE, for each object call, the rpc mechanism can automatically invoke a directory that provides naming and other support protocols for every resource in the network. Thus, application programs can make use of distributed services by issuing calls to remote procedures by name, without knowing their locations, in order to achieve location transparency.

Other middlewares, such as the MQSeries™ and TCP/IP do not have as rich a set of services as DCE, but nevertheless support distributed systems, and heterogeneity to a more limited extent, using a "send-receive" paradigm. These middlewares, and pre-existing distributed systems such as CICS—based and IMS—type systems have very different naming and policy characteristics than those found in DCE.

What can be seen from the forgoing is that different middlewares have different mechanisms for the server to register its services and for the client to find those services, and different ways of guaranteeing data integrity.

In traditional distributed processing, the servers and clients are known ahead of time and provision can be made during programming for communications capability. However, when the program is distributed over a network or has been partitioned so that parts of the program reside on different nodes, it may not be possible to know in advance the identity of the servers and the nature of the communications interface for each processor.

Aspects of this problem have been considered in the prior art. For example, U.S. Pat. No. 5,136,716 entitled "Session Control In Network For Digital Processing System Which Support Multiple Transfer Protocols," of Digital Equipment Corporation, discusses a distributed data processing system that includes a plurality of nodes, where a node maintains one or more objects. One node maintains a naming service which associates each object in the system with one or more data structures called protocol towers. Each protocol tower identifies the object name and a series of entries that each identifies a name for each of the protocol layers, along with the communications parameters and address information that is used in communicating with the object. When a node requires access to an object maintained by another node, it first retrieves from the naming service the protocol towers for the object. If the protocol names in the retrieved tower match the protocol names in the nodes tower, the server can perform the service. An address field from the protocol tower is used for initiating communication between the client node and an object identified by the object name.

U.S. Pat. No. 5,329,619, entitled "Flexible Multi-Platform Partitioning For Computer Applications," of Forte Software, Inc., discloses a cooperative processing interface and communication broker for heterogeneous computing environments. The object interface supports three modes of inter-object communication. A "service broker" manages service requests from a plurality of clients and responds to services provided by a plurality of servers. The clients and servers communicate and exchange information with one another via the "broker." Participant control blocks are provided for both the client and server, and a service control block provides services offered by the server. A set of user functions includes a REGISTER function, where the REGISTER function includes the identity of the server and the identity of the offered service. The service broker determines whether the service request matches the service offered by the server by determining if the service identified in the service request matches that identified in the service control block.

SUMMARY OF THE INVENTION

By contrast, the present invention provides a framework with different implementations of naming services and policy services. These services are added to the framework and used as required during the processing of a remote procedure called on an object. The location is chosen when the user makes a call on an object. Depending on the location and the middleware that correspond to the location, different policies are set and verified for the call.

Accordingly, the present provides a method of automatically assigning policy protocols, such as middleware characteristics on a remote method call issued over a distributed system. The method consists of the computer implemented steps of registering a directory of addresses of service objects for each set of policy protocols supported in the distributed system. On issuance of the remote method call, addresses of all service objects adapted to satisfy the remote method call are obtained. One service object address is selected from the list, and the policy protocols associated with the selected object address are then attached to the remote method call, and the remote call is communicated. Preferably, the policy protocols are validated on the server side.

The present invention also provides a mechanism for permitting this automatic assignment of policy protocols that consists of a framework having at least one directory. Each directory is being associated with a specific set of policy protocols and includes a name and address for each service object on a server in the distributed system supporting that specific set of policy protocols. Also means for locating and selecting an address from a directory for one service object adapted to execute the remote method call is included as well as means to attach the specific set of policy protocols for the directory to the remote method call before communicating the remote method call across the network.

The class library and program data for implementing the method and mechanism for the invention are, of course, stored and transferred on data storage media such as CD-ROM, magnetic tape and floppy disk, as well as files in computer memory that can be transferred electronically.

BRIEF DESCRIPTION OF THE DRAWINGS

FIG. 5 is a flow diagram showing the computer steps for implementing the preferred method of the invention.

DETAILED DESCRIPTION OF THE PREFERRED EMBODIMENTS

Figure 1:
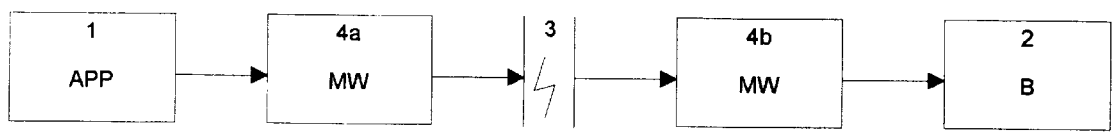
FIG. 1 illustrates a remote call in a distributed system through a middleware interface according to the prior art.

FIG. 1 illustrates the known approach to issuing a remote call across a distributed system using a middleware interface. The application located on a client computer 1 issues a procedure call or invokes a method an object B residing on a server 2 remotely located across a network 3. Both computers of the calling application 1 and called object 2 utilize the same type of middleware interface, generally designated as 4.

In general terms, when caller A resident on computer 1 issues its call to object B resident on computer 2, the call is actually issued to the middleware interface for A located on the client side, where it is reissued in the interface form specific to that middleware (for example, as in rpc in a DCE environment). Following transmission of the method call in this interface form across the network 3, the middleware interface 4b on the server side reissues the call in the data form and with the protocols recognizable by the operating system of computer 2 where the call is executed. The return code transmitted from computer 2 back to computer 1 goes through the same steps in reverse.

Figure 2:
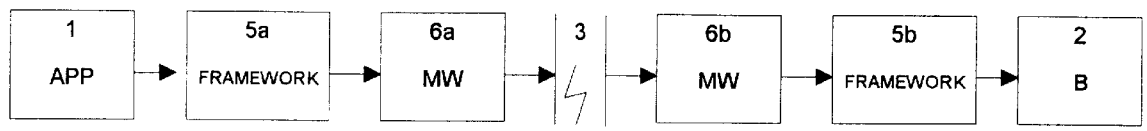
FIG. 2 illustrates a remote call in a distributed system having the framework of the present invention implemented on both the client and the server side of the network.
Figure 3:
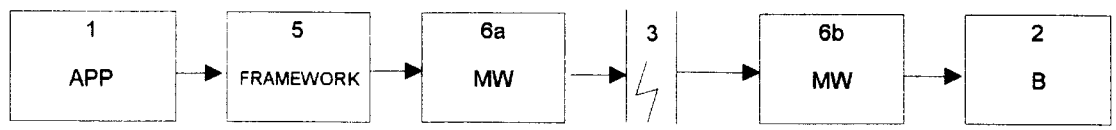
FIG. 3 illustrates a remote call in a distributed system having the framework of the present invention implemented on the client side of the network only.

Use of the framework of the present invention modifies the layout of FIG. 1 in the manner shown in FIGS. 2 and 3. In the layout of FIG. 1, the middleware characteristics of the server are known ahead of time, and are in fact, common with the middleware characteristics of the client In the situations illustrated in FIGS. 2 and 3, and scenarios addressed by the present invention, the identity of the server and its attendant middleware characteristics are not known ahead of time. In fact, there may even be more than one server on the distributed system having objects capable of filling the clients request, and each server may have different middleware associated with it.

In FIG. 2, the client and server are both located in a network in which access to middleware services is made through the framework of the present invention. FIG. 3 illustrates the situation where the server is not located in a local distributed system governed by the framework. For example, the network might be a wide area network, and access to the server be through a switched communications link.

According to the invention, a method call from the application resident on computer 1 on an object B located on computer 2 first invokes the framework 5 or 5a of the invention that establishes the correct middleware interface 6a for the caller 1 to communicate with the middleware 6b of the server 2 who can provide the service requested (FIGS. 2 and 3).

Figure 4:
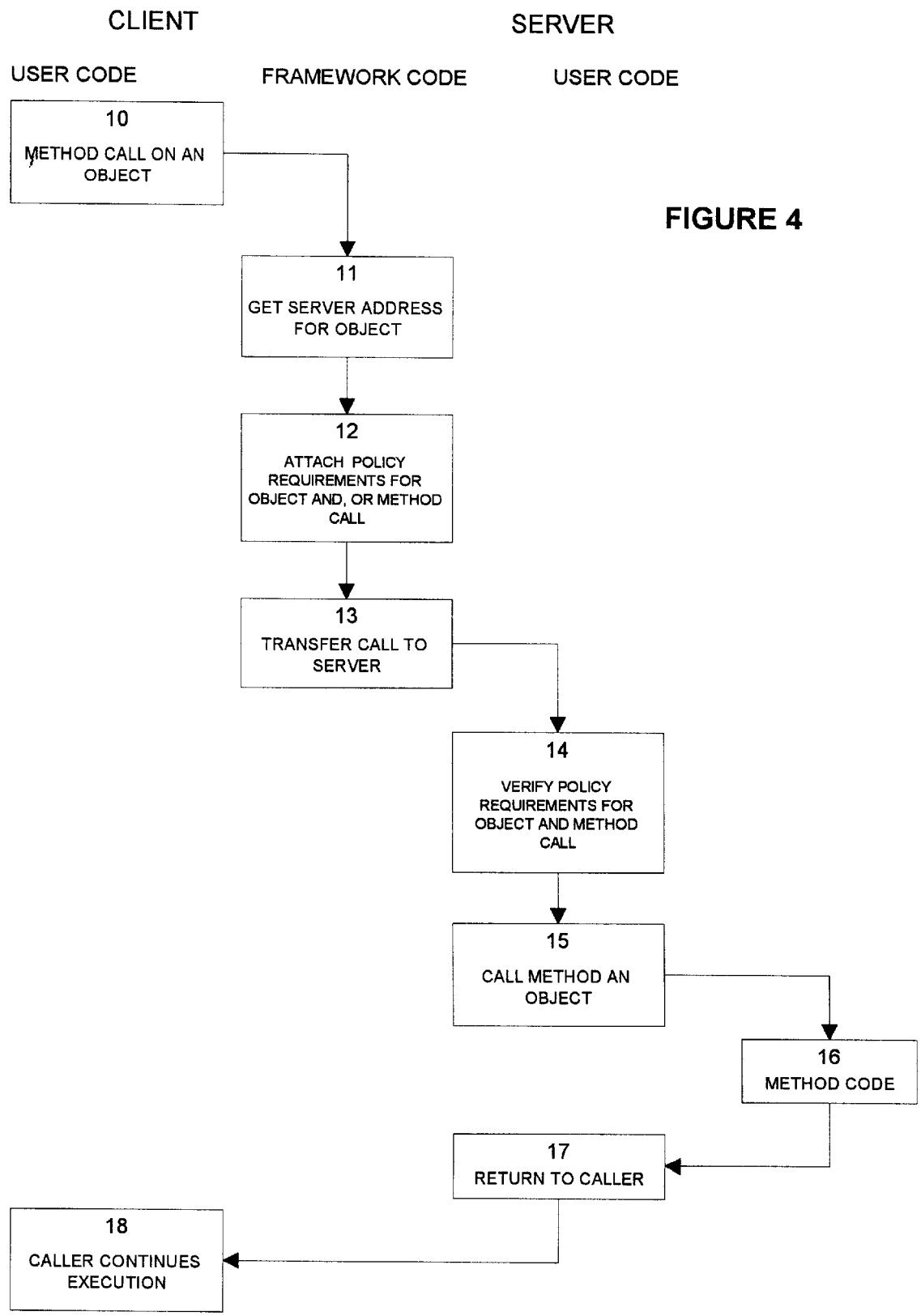
FIG. 4 is a diagram illustrating the flow of control from the client to the server, via the framework of the present invention.

The flow of control shown in FIG. 4 illustrates, in abstract terms, how this is done. Issuance of a method call on an object (block 10) executes a middleware independent stub rather than a call to a specific middleware. The middleware independent stub invokes the framework for getting a service address for an object to perform the method (block 11). This is accomplished by looking up the called method or service in a directory containing addresses for services, and receiving from that directory a list of addresses for objects that can perform the service. The selection of one object from that list may be made randomly.

Each object address in the returned list has a middleware associated with it, so on selecting one object address, the correct middleware characteristics or policy requirements will be known and can be attached to the middleware independent stub of the client (block 12). Once the middleware interface has been established under the framework, the call is transferred to the server (block 13) where the policy requirement for the object and method call are validated when the call arrives (block 14). If the validation is successful, then the method call is actually invoked on the object and the call made to the user's service code (blocks 15 and 16). The results are returned through the framework to the caller for continued program execution (blocks 17 and 18).

In the preferred embodiment of the invention, a distributed class library containing the address and naming services and the policy requirement information for all middleware associated with clients and servers in the distributed system forms the framework. This class library includes the data that provide the "register" of the address and naming service and the policy information for the framework.

The class constructing the address and naming service to provide location transparency must include three operations. The register operation is used by the server to advertise that it can perform a service. The server will support the service until it is unregistered via the unregister operation. The third is the find operation. This is used by the client to find the desired service. The address that is returned on the find operation is the address of the object in the format required by the middleware, as well as the policy requirements of the associated middleware. The abstract address and naming service class could be written, in C++, as:

```
class Address {
public:
    Middleware& getMiddleware () = 0;
    AsString() = 0;
};
class NamingService {
public:
    void register(interface&interface) = 0;
    void unregister(Interface&interface) = 0;
    AddressList find(Interface&interface) = 0;
};
```

The policy service has two required operations. The first is to set the policy information. Policy information that must be set up on the client side must implement this operation. The other required operation is the validate operation. This is called on the server when the call arrives. The abstract policy service class could be written, in C++, as:

```
class PolicyService {
public:
    void set (CallHandle&callhandle) = 0;
    void validate(CallHandle&callhandle) = 0;
    Middleware& getMiddleware() = 0;
};
```

FIG. 5 is a flow diagram detailing the steps implemented by computers throughout a network in implementing a preferred embodiment of the invention. This is the scenario illustrated in FIG. 2; that is a distributed system in which the framework of the present invention is imposed on both client and server sides for regulating call communications across the network.

Prior to issuance of a remote method call, the framework of the invention must be put in place on the network. As computers are booted up or added to the system, directories for each required set of middleware characteristics are registered with the framework (blocks 20 and 26). This information is drawn from the class library. In the case of middleware technologies like MQI and TCP/IP which are more limited than DCE, the framework can be used to implement DCE-like services over multiple middlewares by defining the additional services in the class.

As each object (representing a service provided by the server) is instantiated on the server, the policy information for each middleware over which the object is supported is attached to the object (block 21). The object identifier is then exported to the nameservices for the corresponding middlewares (block 22) and the supported policies registered (Block 23).

When the object proxy is instantiated on the client, the policy information that the to client wants to be guaranteed on the call is set for each middleware on which the call can be made (block 25.)

When a method call is made on the client proxy (block 26), the first determination is whether it is a remote call (block 27). If the processor can satisfy the call internally, it is executed as a local call and the result return to the caller (blocks 28 and 29).

However, if the call is determined to be a remote call, a middleware independent stub is executed (block 30), and the "find" operation accessed (block 31). A list of addresses is obtained from all of the name services directories that are visible to the client program (block 32). One object address is selected, perhaps randomly, from the list to perform the method call (block 33), and the middleware associated with the address is then used to set the required policy information on the call (block 34).

The method call is communicated across the network (block 35) to the location of the server on which the addressed object resides. On receiving the method call, the server verifies that the client's policy requirements are met or exceeded on the server (block 36). If the policy requirements cannot be met by the server, then a middleware specific message (generally an exception) is returned to the caller to permit it to try elsewhere for a replica that can perform the operation with the required policy level (block 37).

If the validate operation is successful, the call will be passed to the server for execution and return of a result to the caller (blocks 38 and 29).

In a case illustrated in FIG. 3 where the server is incorporated in an existing distributed system, such as a CICS—bases system, the framework directories will not receive exported address and middleware policy information. However, the addresses of services objects are generally hard-coded in the system in a "directory-like" form. IN this case, it is the name and address alone of the service object that will be located during the "find" operation, and form the basis for communicating the method call across the network.

Modifications of the described invention which would be obvious to one skilled in the art are intended to be covered by the appended claims.

The embodiments of the invention in which an exclusive property or privilege is claimed are defined as follows:

1. A method for automatic assignment of policy protocols for issuing a remote method call over a distributed system, comprising the computer implemented steps of:

registering directories of all sets of middleware policies supported in the distributed system;

exporting a service object address to every directory representing a set of middleware policies supported by a service object on instantiation of each service object;

registering the supported policies for each service object instantiated;

on issuance of the remote method call, obtaining addresses for all service objects adapted to execute the remote method call and selecting one of said addresses;

attaching to the remote method call the policy protocols for the directory from which the said one address is selected; and communicating the remote method call over the distributed system to the service object on a server.

2. The method, according to claim 1, wherein the sets of middleware policies registered in the directories are obtained from a class library.

3. The method, according to claim 1, further comprising the computer implemented steps of:

validating the policy protocols attached to the remote method call on receipt at the server;

and, if validation fails, returning an exception across the distributed system.

4. The method, according to claim 1, further comprising the computer implemented steps of:

validating the policy protocols attached to the remote method call on receipt at the server;

and, if validation succeeds, executing the remote method call on the service object.

5. A mechanism for automatic assignment of policy protocols for issuing a remote method call over a distributed system, comprising:

means for registering directories of all sets of middleware policies supported in the distributed system;

means for exporting a service object address to every directory representing a set of middleware policies supported by a service object on instantiation of each service object;

means for registering the supported policies for each service object instantiated;

on issuance of the remote method call, means for obtaining addresses for all service objects adapted to execute the remote method call and selecting one of said addresses;

means for attaching to the remote method call the policy protocols for the directory from which the said one address is selected; and means for communicating the remote method call over the distributed system to the service object on a server.

6. The mechanism, according to claim 5, wherein the sets of middleware policies registered in the directories are obtained from a class library.

7. The mechanism, according to claim 5, further comprising:

means for validating the policy protocols attached to the remote method call on receipt at the server;

and, if validation fails, means for returning an exception across the distributed system.

8. The mechanism, according to claim 5, further comprising:

means for validating the policy protocols attached to the remote method call on receipt at the server;

and, if validation succeeds, means for executing the remote method call on the service object.

* * * * *